Aug. 6, 1940.     V. C. NEUENS     2,210,253
COCKROACH TRAP
Filed Aug. 4, 1939

Inventor
V. C. Neuens

By Clarence A. O'Brien
and Hyman Berman
Attorneys

Patented Aug. 6, 1940

2,210,253

UNITED STATES PATENT OFFICE 2,210,253

COCKROACH TRAP

Victor C. Neuens, Taft, Calif.

Application August 4, 1939, Serial No. 288,471

1 Claim. (Cl. 43—121)

This invention relates to a trap for cockroaches and the like, the general object of the invention being to provide means whereby the insects are attracted by bait to points where they will drop into the trap with the trap having a curved flange which prevents the insects from getting out the trap.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
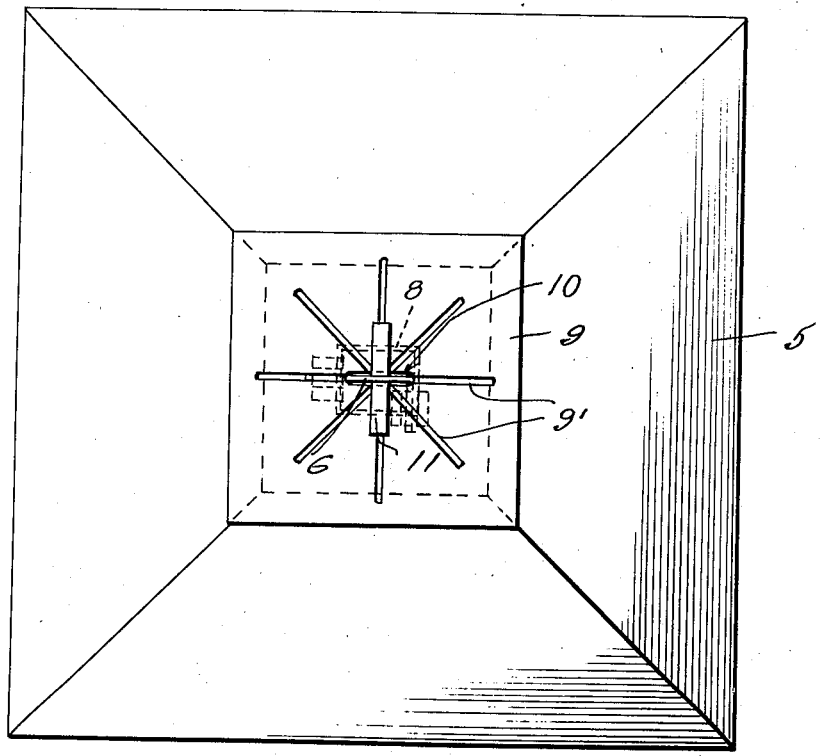
Figure 1 is a top plan view of the improved trap.
Figure 2:
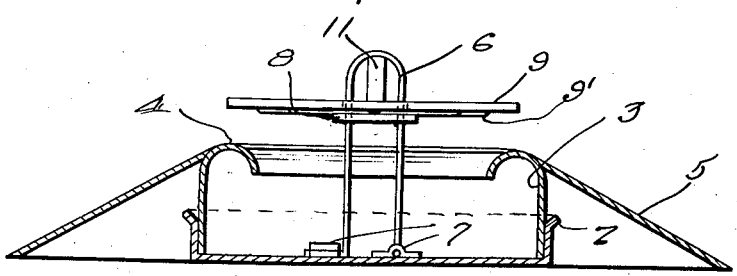
Figure 2 is a vertical sectional view thereof.
Figure 3:
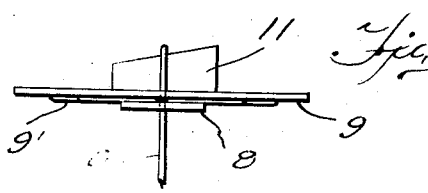
Figure 3 is a detail view showing the means for connecting the cover to the handle.

In these views the numeral 1 indicates a flanged member which is shown in the drawing as of rectangular shape but which may be of round or any other suitable shape. The flange has its upper edge bent outwardly as shown at 2 and a member 3 is pressed into the member 1, the outwardly bent part 2 facilitating the placing of the part 3 in the part 1. This member 3 extends well above the flange of the member 1 and has its upper portion bent inwardly into inverted trough shape in cross section as shown at 4 so as to provide an arcuate flange which overhangs the interior of the trap formed by the parts 1 and 3 so that the insects cannot climb up the walls of the trap in an attempt to escape therefrom. A sloping ramp 5 extends from the outer portion of the part 4 downwardly and outwardly to the surface upon which the trap rests so that the insects can climb up this ramp and as soon as they start to pass on to the part 4 they will fall down the same and thus fall into the trap. A handle 6 formed of an inverted U-shaped member has its limbs provided with bent terminal parts which engage the eye members 7 attached to or formed with the bottom of the member 1, one member being arranged at right angles to the other and the bent terminals of the legs of the handle are bent in the same direction, this arrangement of the parts holding the handle in upright position.

This arrangement also permits the handle to be removed from the body of the trap when it is desired to pack or store the device. A small cup-shaped member 8 is fastened to an upper portion of the handle and it contains syrup or other bait and an enlarged cover member 9 has a slot 10 therein to pass over the upper part of the handle to rest upon the member 8 and said cover is removably held in place on the member 8 by means of the wedge 11 so that by removing the wedge the cover can be removed whenever desired.

This cover not only prevents cats and other animals from getting to the bait but it will also prevent the insects being seen and by removing the part 1 from the part 3 the insects can be readily removed or dumped from the device.

The plate is formed with the radiating elongated depressions 9' which not only act to strengthen the plate but they also act to space the cup-shaped member 8 from the underside of the plate which permits the odor from the bait in the member 8 to escape so that the insects will be attracted to the trap.

It is thought from the foregoing description that the advantages and novel features of the invention will be readily apparent.

It is to be understood that changes may be made in the construction and in the combination and arrangement of the parts provided that such changes fall within the scope of the appended claim.

Having described the invention, what is claimed as new is:

A trap of the class described comprising a receptacle having its upper edge bent inwardly and downwardly to cause insects on said edge to drop into the receptacle, an upright handle member connected with the bottom of the receptacle and passing upwardly beyond the top thereof, a bait holder carried by the handle member and a horizontally arranged plate carried by the handle member above the holder and covering but spaced above the opening formed by the inwardly and downwardly extending upper edge of the receptacle, said plate having a slot therein for the passage of the handle and said slot exposing the bait in the holder, and ribs on the underside of the plate and contacting the holder for spacing the plate from the holder.

VICTOR C. NEUENS.